United States Patent
Jüptner

(10) Patent No.: US 6,834,598 B2
(45) Date of Patent: Dec. 28, 2004

(54) AGRICULTURAL GROUND WORKING IMPLEMENT

(75) Inventor: Detlef Jüptner, Kleinblittersdorf (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/178,132

(22) Filed: Jun. 24, 2002

(65) Prior Publication Data

US 2002/0162492 A1 Nov. 7, 2002

Related U.S. Application Data

(63) Continuation of application No. 09/605,245, filed on Jun. 28, 2000, now abandoned.

(51) Int. Cl.[7] ............................................. A01B 49/04
(52) U.S. Cl. ...................... 111/140; 111/142; 111/60; 172/551
(58) Field of Search .................. 172/551, 599, 172/573, 579, 576; 111/52, 139, 140, 141, 142, 143, 60, 62

(56) References Cited

U.S. PATENT DOCUMENTS

| | | | | |
|---|---|---|---|---|
| 4,377,979 A | * | 3/1983 | Peterson et al. | 111/52 |
| 4,785,890 A | * | 11/1988 | Martin | 172/29 |
| 5,341,754 A | * | 8/1994 | Winterton | 111/139 |
| 5,349,911 A | * | 9/1994 | Holst et al. | 111/139 |
| 5,461,995 A | * | 10/1995 | Winterton | 111/139 |
| 5,477,792 A | * | 12/1995 | Bassett et al. | 111/121 |
| 5,507,351 A | * | 4/1996 | Martin | 172/558 |
| 5,542,362 A | * | 8/1996 | Bassett | 111/120 |
| 5,640,914 A | * | 6/1997 | Rawson | 111/140 |
| 5,660,126 A | * | 8/1997 | Freed et al. | 111/140 |
| 5,697,455 A | * | 12/1997 | Deckler | 172/624.5 |
| 5,704,430 A | * | 1/1998 | Smith et al. | 172/29 |
| 5,970,892 A | * | 10/1999 | Wendling et al. | 111/139 |
| 6,135,037 A | * | 10/2000 | Juptner | 111/139 |
| 6,223,663 B1 | * | 5/2001 | Wendling et al. | 111/139 |
| 6,253,692 B1 | * | 7/2001 | Wendling et al. | 111/139 |

* cited by examiner

*Primary Examiner*—Victor Batson

(57) ABSTRACT

An agricultural ground working implement is provided with a first ground working unit and a second ground working unit that follows the first ground working unit. A row cleaner is assigned to the portion of the soil upon which the second ground working unit acts. The row cleaner extends rearwardly from the first ground working unit.

10 Claims, 4 Drawing Sheets

AGRICULTURAL GROUND WORKING IMPLEMENT

This application is a continuation of application Ser. No. 09/605,245, filed Jun. 28, 2000, now abandoned.

BACKGROUND OF THE INVENTION

1. Field of the Invention

The present invention is directed to an agricultural ground working implement comprising a first ground working unit and a second ground working unit following the first ground working unit, wherein a row cleaner for the second ground working unit is mounted to the first ground working unit.

2. Description of the Prior Art

Row cleaners are used for cleaning refuse, e.g., straw or the like, from the soil surface lying directly in front of the working area of a ground working unit. These ground working units may be sowing units and/or fertilizing units.

European Patent EP 894 426 A and U.S. Pat. No. 5,341,754 describe a row cleaner of this type which is arranged on the arm of a sowing unit—which connects the sowing unit to a carrier—in such a position that it leads the sowing unit. A complicated holding arrangement in the form of a parallelogram is used for this purpose.

Another row cleaner is known from U.S. Pat. No. 2,611,331, U.S. Pat. No. 4,796,550, French Patent 1 576 504 and EP 453 420 A. In this case, the row cleaner is separately mounted on a frame of the sowing machine (such that it leads a sowing unit). However, this arrangement results in a disadvantageous elongation of the entire arrangement.

SUMMARY

It is an object of the present invention to provide a compact and simple holding arrangement for a row cleaner.

Two ground working units are mounted to an implement and are arranged one behind the other in a fore/aft or longitudinal direction. The first ground working unit is mounted in front of the second ground working unit. The two ground working units are laterally offset relative to one another. The row cleaner of the second ground working unit is mounted to the first ground working unit. The second ground working unit row cleaner removes possible obstacles, e.g., refuse, straw, etc., from the soil region directly in front of the second ground working unit.

In the preferred embodiment, the row cleaner extends rearwardly from the first ground working unit. As such, the holding arrangement for the second ground working unit row cleaner can be designed significantly simpler and consequently less expensive than the holding arrangements having provisions for row cleaners. Thereby resulting in a relatively compact design.

It is also possible to mount the row cleaner to the first ground working unit so that it extends forwardly from the first ground working unit, since the second ground working unit is laterally offset from the first ground working unit. However, it would be more advantageous to arrange the row cleaner for the second ground working unit such that it extends rearwardly from the first ground working unit.

The row cleaner for the second ground working unit is either directly or indirectly mounted on a carrying arm of the first ground working unit by means of a connecting support. The carrying arm conventionally supports the first ground working unit and (usually indirectly) the corresponding ground working elements—e.g., furrow openers, press wheels, and/or sowing ploughshares. The carrying arm is pivotally mounted to a carrier which in turn is pivotally mounted to the frame of the implement. The connecting support is directly mounted on the carrying arm if a direct mounting is chosen; if an indirect mounting is chosen, the connecting support can be mounted on a support that is connected to the carrying arm. This support preferably also serves for fixing ground working units.

The row cleaner is usually flexibly mounted to the ground working unit, so that it can move vertically when it encounters an obstacle. To that end the carrying arm is pivotally mounted to the connecting support such that the carrying arm can be pivoted about a transverse axis.

The carrying arm and row cleaner may be biased downwardly towards the soil with only its weight. However, a spring extending between the carrying arm and connecting support may supplement the weight of the carrying arm and row cleaner to increase the biasing force. In this case, a variable spring force is preferred, with this variable spring force being realized by arranging one end of the spring at different points.

It may also be desirable to design the row cleaner such that it can be raised together with the first ground working unit. For this purpose, the ground working unit is mounted to a rotatable carrier. The rotation of the carrier causes the ground working unit as well as the row cleaner to be raised.

A connecting support that is rigidly connected to the ground working unit could be utilized for raising the row cleaner together with the ground working unit. However, such a connecting support proved disadvantageous during the operation of the ground working implement. In the preferred embodiment a plate is connected to the connecting support and (only) contacts an element of the ground working unit during the lifting motion, with the plate causing the connecting support to be raised together with the row cleaner. However, a plate that is arranged on an arbitrary element of the ground working unit and respectively contacts the row cleaner or the connecting support during the lifting motion would also be conceivable.

It is also practical to provide a row cleaner for the front ground working unit of the implement. This row cleaner can be conventionally arranged on the front ground working unit such that it extends forwardly from the unit.

DETAILED DESCRIPTION

The sowing machine which is described below as an example of an agricultural ground working implement serves for distributing seeds and/or fertilizers, and may be utilized on prepared soil as well as for direct seeding and mulch seeding.

Figure 1:
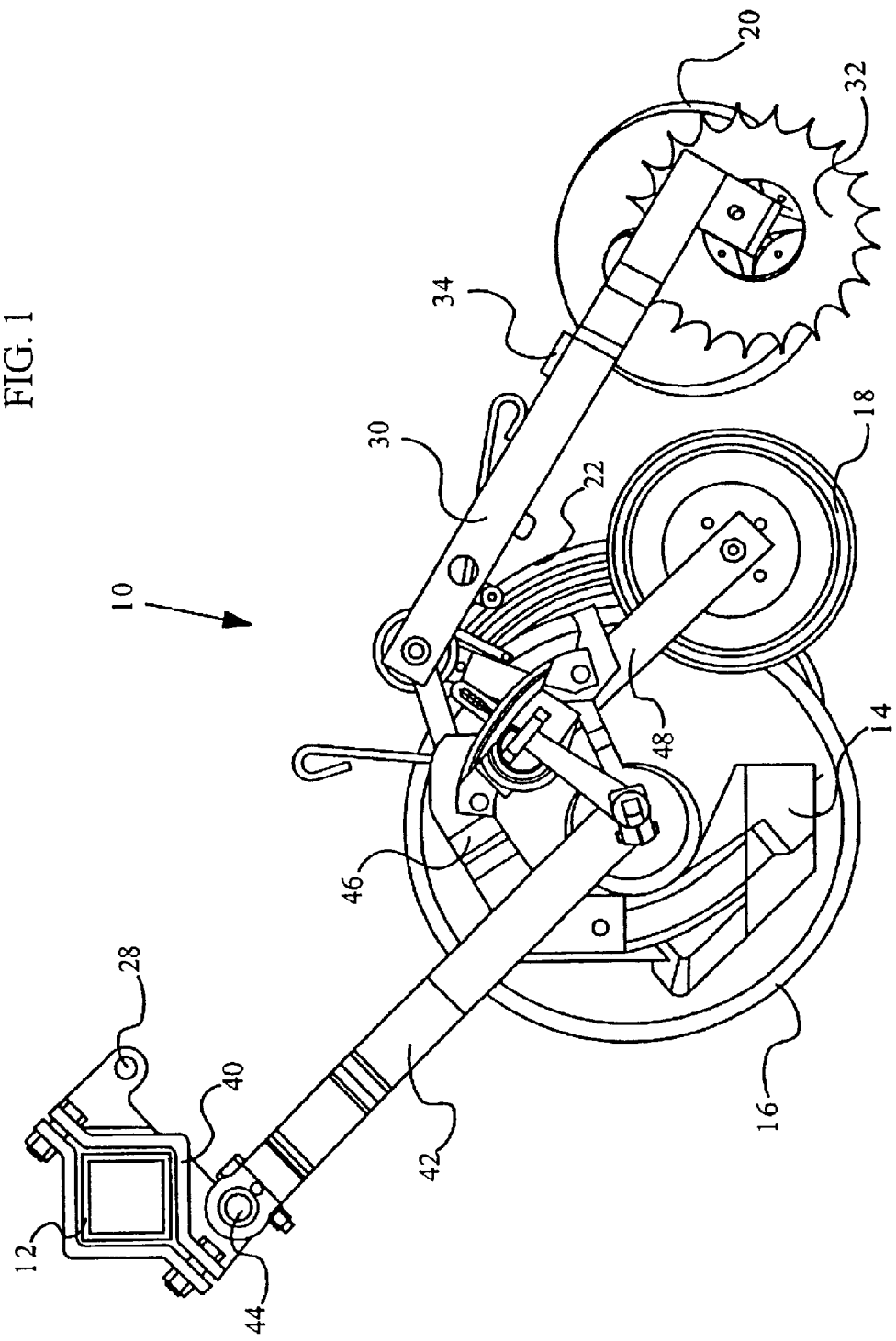
FIG. 1, is a side view of a front sowing unit of a sowing implement with a row cleaner for a following sowing unit, not shown.
Figure 4:
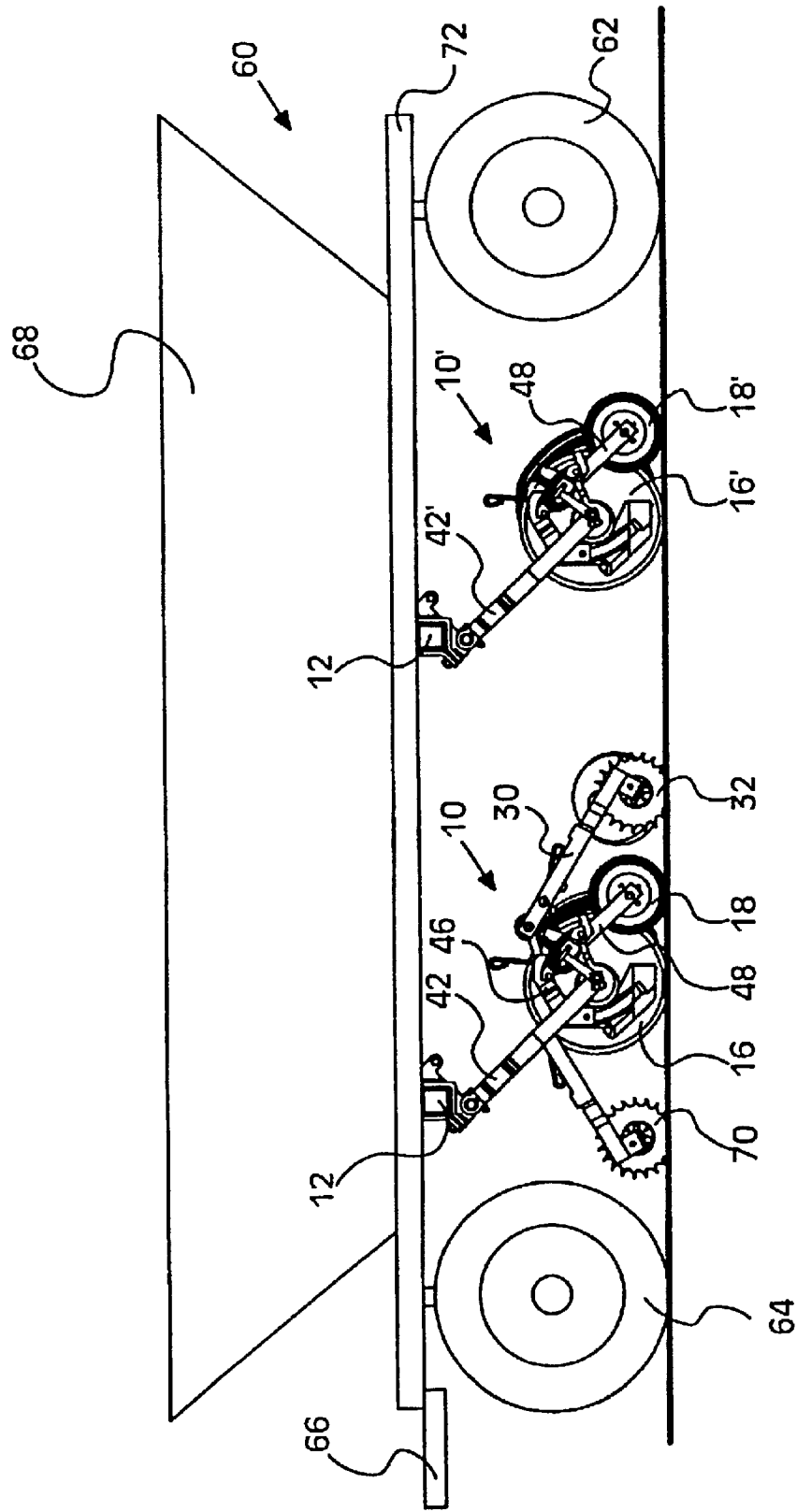
FIG. 4, a schematic side view of the sowing machine.

Among other things, the sowing machine contains a carrier 12 that is connected to a frame 72 (see FIG. 4). The carrier 12 carries several ground working units in the form of sowing units 10, one of which is illustrated in FIG. 1. The ground working unit 10 is provided with at least one holding arrangement 30 for a row cleaner 32. The sowing machine usually contains several sowing units 10, typically, 6,8,10 or 12 sowing units are provided.

The carrier 12 comprises a rectangular tube and mounted to the underside of frame 72 by bearings, not shown. By pivoting the carrier 12, the sowing units 10 can be pivoted between an operative position in contact with the soil and an inoperative position not in contact with the soil. The carrier 12 usually extends over the width of the frame 72 and is able to accommodate a number of identical sowing units 10.

Figure 3:
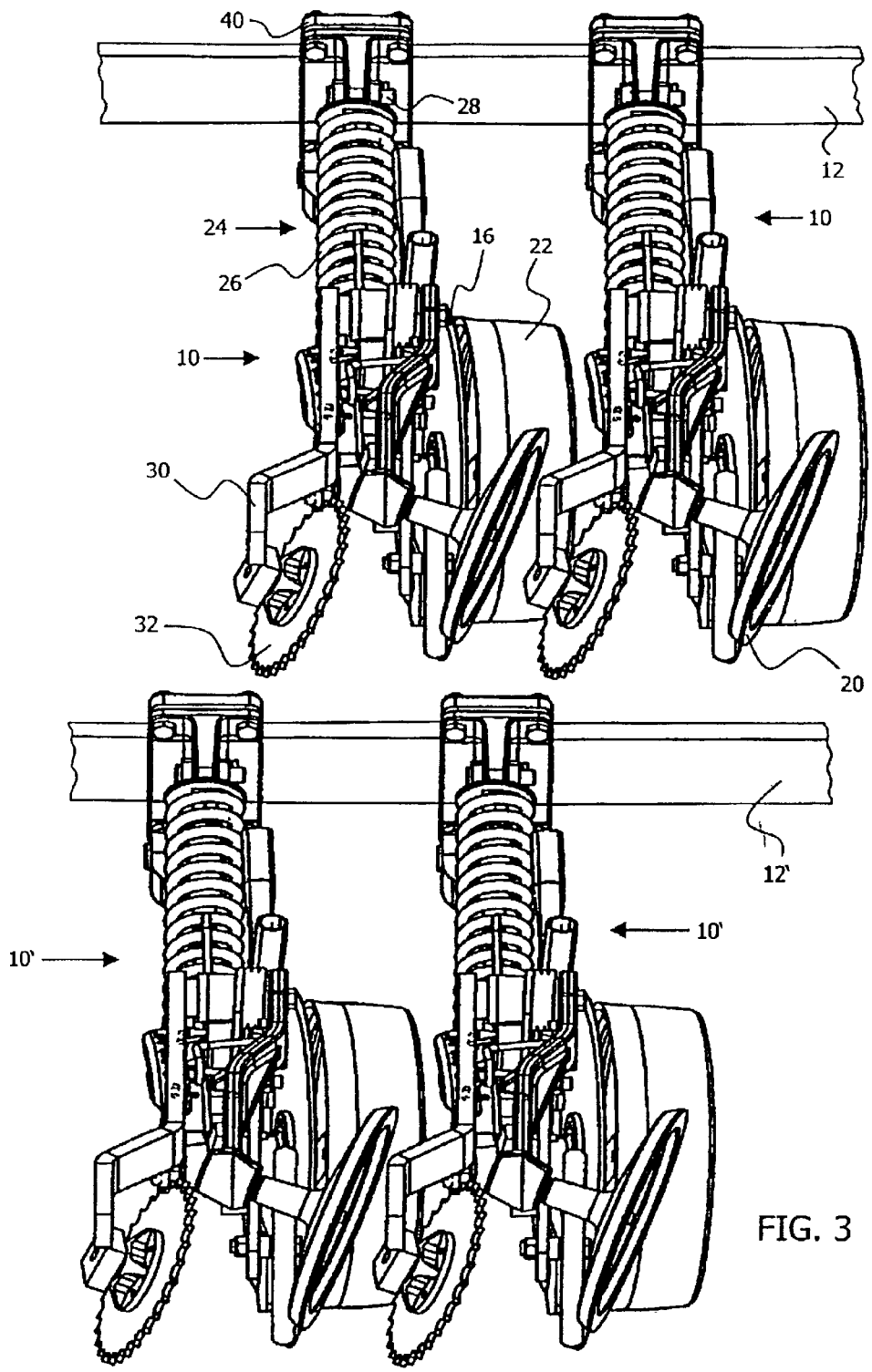
FIG. 3, a rear view of the sowing machine.

The sowing unit 10 itself is relatively conventional and comprises mounting bracket 40, a carrying arm 42, a furrow opener 16, a depth adjustment wheel 22, a sowing ploughshare 14, a press wheel 18, a closing wheel 20 and a pressure unit 24 (see FIG. 3). U.S. Pat. Nos. 5,727,638, 5,970,892 and 6,135,037 disclose corresponding sowing units 10 and these publications are incorporated herein by reference.

The mounting bracket 40 is clamped onto the carrier 12 such that it is unable to rotate relative to the carrier 12. The bracket 40 comprises two parts and can be clamped onto the carrier 12 at an arbitrary lateral location. The carrying arm 42 extends downwardly and rearwardly from the carrier 12. The carrying arm is mounted to a carrying arm bearing 44 on the mounting bracket 40. The carrying arm bearing allows the sowing unit 10 to pivot relative to the mounting bracket 40 in a vertical manner. The furrow opener 16 is rotatably connected to end of the carrying arm 42 remote from the carrying arm bearing 44. During operation, the sowing unit 10 is moved over the ground from the right toward the left. A support 46 branches off upwardly and rearwardly from the carrying arm 42.

The furrow opener 16 comprises a disk that penetrates into the soil. The disc is slightly inclined relative to the driving direction and produces a furrow for receiving seeds. When encountering an obstacle, the furrow opener 16 is able to move upwardly together with the carrying arm 42 about the carrying arm bearing 44. To move upwardly the disc and carrying arm to which it is rotatively attached must overcome the downward biasing force of the pressure unit 24. The pressure unit 24 comprises a spring 26 arranged between the mounting bracket 40 and the support 46. The rotatable depth adjustment wheel 22 is arranged laterally adjacent to the furrow opener 16, and serves for adjusting the depth of the furrow produced in the soil by the furrow opener 16.

The sowing ploughshare 14 is situated within the shadow region of the furrow opener 16 and is rigidly connected to the carrying arm 42 in such a way that it ends underneath the surface of the soil. The input side of the sowing ploughshare 14 is connected to a tube for receiving seeds from a seed container of the sowing machine.

Figure 2:
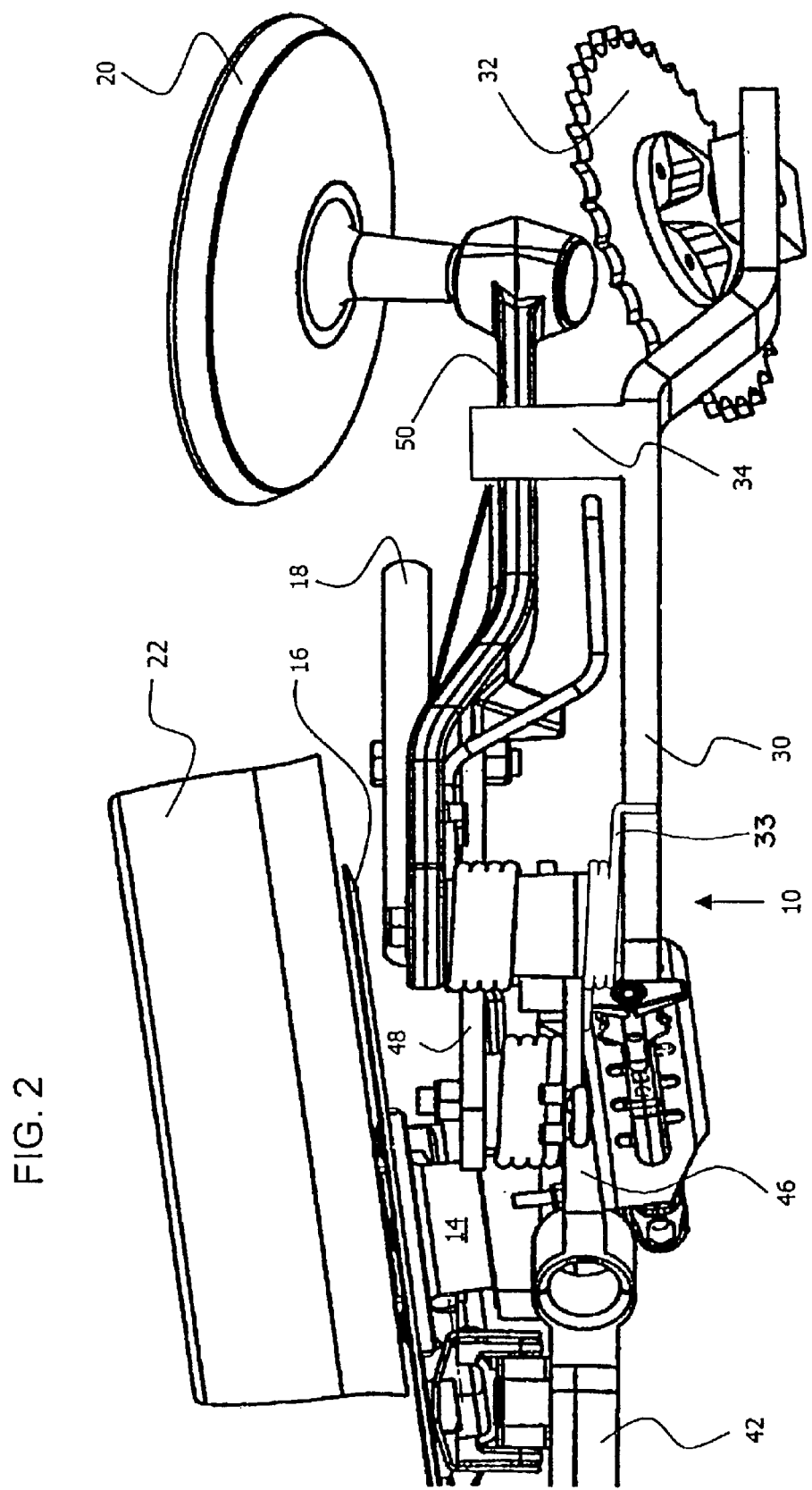
FIG. 2, a top view of the sowing unit shown in FIG. 1.

The disk-shaped press wheel 18 and the disk-shaped closing wheel 20 are respectively connected to the support 46 in a pivoted and spring-loaded fashion by means of holders 48 and 50 (see FIG. 2). The press wheel 18 presses the deposited seeds into the furrow that was opened by the furrow opener 16. The closing wheel is inclined in such a way that it collapses one wall of the furrow thereby covering the seed with soil. Alternatively (or additionally) to the press wheel 18, it would also be conceivable to utilize an additional closing wheel or a concave disk that also opens a furrow into which the fertilizer and/or the seeds is/are deposited by means of a corresponding ploughshare. The spring force, with which the press wheel 18 and the closing wheel 20 act upon the soil, can be varied by selecting the bearing points for the corresponding spring.

The pressure unit 24 contains a spring 26 and a displacement limiter which respectively engage the mounting bracket 40 on a pressure unit bearing 28 and on the support 46 with the other end. The spring 26 conventionally presses the carrying arm 42 against the soil such that the furrow opener 16 penetrates into the soil and produces a furrow.

According to the invention, a row cleaner 32 is arranged on the trailing end of the sowing unit 10. This row cleaner 32 is provided with a serrated gear tooth type edge that cleans the soil of refuse, e.g., mulch, straw, leaves, etc. for a second sowing unit 10' that follows the first sowing unit. The row cleaner 32 is connected to the support 46 by means of a holding arrangement 30. The holding arrangement 30 is pivotally mounted on the support 46 such that it can be pivoted about a transverse axis. In addition, the holding arrangement 30 can be biased downwardly by means of a spring 33 so that the row cleaner 32 acts upon the soil with a defined force. The row cleaner 32 is shaped like a disc and is rotatively mounted to the holding arrangement 30. The row cleaner disc is laterally inclined.

As illustrated in FIG. 2, a plate 34 extends above the holder 50 of the closing wheel 20 and is arranged on the upper side of the holding arrangement 30. If the sowing unit 10 is moved into its inoperative position, i.e., lifted upward, due to a rotation of the carrier 12, the holding arrangement 30 of the row cleaner 32 is also pivoted by the holder 50 of the closing wheel 20 contacting plate 34. However, the holder 50 and the plate 34 are not in contact with one another in the operative position of the sowing unit 10.

The plate 34 has been omitted from FIG. 3 to provide a better overview. The sowing machine contains first sowing units 10 that are mounted on a first carrier 12. Two of these sowing units are shown in FIG. 3. The second sowing units 10' are mounted on a second career 12'. The second sowing units 10 are laterally offset from the first sowing units 10 and do not follow the same track as the first sowing units 10. The row cleaners 32 of the first sowing units 10 clean the soil of refuse and the like within the region to be traveled by the following second sowing units 10'. It should be mentioned that the respectively last sowing units 10 viewed in the forward moving direction of the sowing machine are not equipped with a row cleaner 32 because no sowing units 10 follow the last sowing units. This means that third sowing units follow the second sowing units 10' shown in FIG. 3. The first sowing units 10 of the sowing machine viewed in the forward moving direction may be equipped with conventional row cleaners that are arranged on the leading end of the sowing unit 10, e.g., as described in EP 894 426 A.

The general design of a corresponding sowing machine 60 is shown in FIG. 4. The sowing machine 60 contains a frame 72 that is supported on the soil by wheels 62 and moved over a field by a towing vehicle, in particular, a field tractor, with the aid of a hitch 66 or another suitable towing mechanism (namely from the right to the left in FIG. 4). A seed container 68 that is connected to the sowing ploughshares 14 is situated on the frame 72. The first sowing unit 10 is equipped with a leading row cleaner 70 that may be constructed as described in EP 894 426 A, and cleans the soil region to be processed by the first sowing unit 10 of refuse, e.g., straw, etc. In other respects, the first sowing unit 10 corresponds to the sowing unit 10 shown in FIGS. 1–3. The second sowing unit 10' which follows the first sowing unit 10 does not contain a row cleaner 32 since the soil region to be processed by this sowing unit was already cleaned by the row cleaner 32 mounted on the first sowing unit 10 and no additional sowing units follow the second sowing unit.

The present invention should not be limited by the above described embodiments, but should be limited solely by the claims that follow:

I claim:

1. Agricultural ground working implement comprising:
   a frame;
   a first ground working unit having ground working elements, the first ground working unit being directly mounted to the frame;
   a second ground working unit having ground working elements, the second ground working unit being directly mounted to the frame, the second ground working unit follows the first ground working unit, the second ground working unit is laterally offset from the first ground working unit; and
   a row cleaner for clearing debris from the soil upon which the second ground working unit acts, wherein the row cleaner is directly mounted on the first ground working unit, the row cleaner extends rewardly from the first ground working unit, the first ground working unit is provided with a carrying arm which is pivotally mounted to a carrier on the frame, the row cleaner is mounted to the carrying arm by a connecting support.

2. Agricultural ground working implement as defined by claim 1 wherein the connecting support is mounted to a support which is mounted to the carrying arm, the ground working elements of the first ground working unit being mounted to the support.

3. Agricultural ground working implement as defined by claim 2 wherein the connecting support is pivotally mounted to the support so that it can be pivoted about a transverse axis relative to the carrying arm.

4. Agricultural ground working implement as defined by claim 3 wherein the row cleaner is biased downwardly into contact with the soil by a spring.

5. Agricultural ground working implement as defined by claim 4 wherein the spring is supported on the connecting support, the spring having a first end supported on the carrying arm and a second end supported on the support.

6. Agricultural ground working implement as defined by claim 5 wherein the row cleaner can be raised together with the first ground working unit.

7. Agricultural ground working implement as defined by claim 6 wherein a plate extending from the connecting support produces a connection between the connecting support and the first ground working unit when the first ground working unit is raised.

8. Agricultural ground working implement as defined by claim 7 wherein another row cleaner is located in front of the first ground working unit for clearing debris from the soil upon which the first ground working unit acts.

9. Agricultural ground working implement as defined by claim 8 wherein the another row cleaner is mounted on the first ground working unit.

10. Agricultural ground working implement as defined by claim 9 wherein the first and second ground working units comprise sowing unit having a furrow opener for forming a furrow in the soil.

* * * * *